(12) United States Patent
Dobbs

(10) Patent No.: US 12,546,075 B2
(45) Date of Patent: Feb. 10, 2026

(54) SHORELINE STABILIZATION AND EROSION CONTROL

(71) Applicant: Seabreeze Nurseries, Inc., Fort Myers, FL (US)

(72) Inventor: Justen Dobbs, Fort Myers, FL (US)

(73) Assignee: SEABREEZE I.P., Fort Myers, FL (US)

( * ) Notice: Subject to any disclaimer, the term of this patent is extended or adjusted under 35 U.S.C. 154(b) by 176 days.

(21) Appl. No.: 17/975,031

(22) Filed: Oct. 27, 2022

(65) Prior Publication Data
US 2024/0141606 A1    May 2, 2024

(51) Int. Cl.
*E02B 3/12* (2006.01)
*E02B 3/04* (2006.01)

(52) U.S. Cl.
CPC ..................... *E02B 3/04* (2013.01)

(58) Field of Classification Search
CPC . E02B 3/04; E02B 3/122; E02B 3/126; E02B 3/123; E02B 3/125; E02D 17/202; E02D 5/80; E02D 17/20; E02D 2300/0071; E02D 2300/0009; E02D 2600/30; E02D 2300/001; E02D 2300/0026; E02D 2300/0006; E02D 2300/0079; E02D 2300/0051; Y02A 10/11
See application file for complete search history.

(56) References Cited

U.S. PATENT DOCUMENTS

| | | | | |
|---|---|---|---|---|
| 488,422 A * | 12/1892 | Brown | ...................... | E02B 3/10 405/107 |
| 3,218,808 A * | 11/1965 | Smith | ...................... | E02B 3/06 405/21 |
| 3,333,420 A * | 8/1967 | Henson | ...................... | E02B 3/02 405/33 |
| 3,344,609 A * | 10/1967 | Greiser | ...................... | E02B 3/04 405/20 |
| 3,374,635 A * | 3/1968 | Crandall | ................. | E02B 3/127 405/18 |
| 3,835,651 A * | 9/1974 | Butterworth | .............. | E02B 3/02 405/74 |
| 4,184,788 A * | 1/1980 | Colle | ...................... | E02B 3/127 405/18 |
| 4,374,629 A * | 2/1983 | Garrett | .................... | E02B 3/043 405/24 |
| 4,405,257 A * | 9/1983 | Nielsen | ................... | E02B 3/127 405/18 |
| 4,449,847 A * | 5/1984 | Scales | ..................... | E02B 3/127 405/17 |
| 4,478,533 A * | 10/1984 | Garrett | ................... | E02B 3/043 405/24 |

(Continued)

OTHER PUBLICATIONS

Seachange Consulting; "How to Protect Your Property from Shoreline Erosion: A handbook for estuarine property owners in North Carolina"; https://digital.ncdcr.gov/Documents/Detail/how-to-protect-your-property-from-shoreline-erosion-a-handbook-for-estuarine-property-owners-in-north-carolina/3692152 (Year: 2011).*

(Continued)

*Primary Examiner* — Edwin J Toledo-Duran
(74) *Attorney, Agent, or Firm* — Bryan L. Loeffler, Esq.; LOEFFLER IP GROUP, P.A.

(57) ABSTRACT

Systems and methods for stabilizing and controlling the erosion of waterbody shorelines.

7 Claims, 4 Drawing Sheets

(56) References Cited

U.S. PATENT DOCUMENTS

| | | | | |
|---|---|---|---|---|
| 4,521,131 A * | 6/1985 | Nandlal | E02B 3/10 | 405/116 |
| 4,669,913 A * | 6/1987 | Temple | E02B 3/04 | 405/15 |
| 4,683,156 A * | 7/1987 | Waters | E02D 17/20 | 405/20 |
| 4,722,639 A * | 2/1988 | Alsop | E02B 3/043 | 405/24 |
| 4,902,166 A * | 2/1990 | Bores | E02B 3/06 | 405/30 |
| 4,919,567 A * | 4/1990 | Sample | E02B 3/127 | 405/17 |
| 5,024,560 A * | 6/1991 | Reilly | E02B 3/04 | 405/303 |
| 5,104,258 A * | 4/1992 | Ianell | E02B 3/04 | 405/15 |
| 5,108,223 A * | 4/1992 | Medina Folgado | E02B 3/12 | 405/21 |
| 5,178,489 A * | 1/1993 | Suhayda | E02B 3/06 | 405/21 |
| 5,294,213 A * | 3/1994 | Parks | E02B 3/04 | 405/21 |
| 5,370,475 A * | 12/1994 | LeBlanc | E02B 3/122 | 405/20 |
| 5,595,458 A * | 1/1997 | Grabhorn | E02B 3/125 | 210/170.03 |
| 6,623,214 B1 * | 9/2003 | Hauske | E02D 37/00 | 405/32 |
| 7,674,071 B2 * | 3/2010 | Shaw | E02D 29/0225 | 405/74 |
| 9,181,668 B1 * | 11/2015 | Hill | E02B 3/122 | |
| 11,555,284 B1 * | 1/2023 | Smith | E02D 17/20 | |
| 11,661,716 B1 * | 5/2023 | Jonassen | E02B 3/123 | 405/20 |
| 2002/0110422 A1 | 8/2002 | Hulsemann | E02B 3/06 | 405/25 |
| 2002/0150429 A1 * | 10/2002 | Hull | B09C 1/02 | 405/129.2 |
| 2007/0053752 A1 * | 3/2007 | Kim | E02B 3/12 | 405/115 |
| 2007/0160424 A1 * | 7/2007 | Underwood | E03F 1/002 | 405/36 |
| 2007/0181072 A1 * | 8/2007 | Davis | A01K 61/54 | 119/208 |
| 2007/0283866 A1 * | 12/2007 | Veazey | B63C 1/04 | 114/77 R |
| 2008/0056823 A1 * | 3/2008 | Farrell | E02B 3/04 | 405/23 |
| 2008/0187398 A1 * | 8/2008 | Brais | E02B 3/04 | 405/21 |
| 2008/0199256 A1 * | 8/2008 | McPhillips | B09C 1/08 | 405/129.57 |
| 2011/0033237 A1 * | 2/2011 | Kanand | E02D 17/20 | 405/17 |
| 2011/0305511 A1 * | 12/2011 | Heselden | E02B 3/06 | 405/16 |
| 2012/0087735 A1 * | 4/2012 | Van Den Broeck | E02B 3/06 | 405/117 |
| 2013/0031852 A1 * | 2/2013 | Hill | E01F 8/0023 | 52/302.1 |
| 2014/0042064 A1 * | 2/2014 | Byeon | C02F 3/046 | 210/170.01 |
| 2014/0140769 A1 * | 5/2014 | Knezek | E02B 3/128 | 106/803 |
| 2014/0261192 A1 * | 9/2014 | Abeles | A01K 31/12 | 119/28.5 |
| 2015/0056016 A1 * | 2/2015 | Popa | E02B 1/00 | 405/30 |
| 2015/0078825 A1 * | 3/2015 | Messina | E02B 3/06 | 405/16 |
| 2015/0292172 A1 * | 10/2015 | Martin | E02B 3/04 | 405/21 |
| 2016/0348327 A1 * | 12/2016 | Martin | E02B 3/04 | |
| 2017/0233965 A1 * | 8/2017 | Boasso | E02B 3/121 | 405/20 |
| 2017/0268191 A1 * | 9/2017 | Klenert | E02B 3/06 | |
| 2018/0000030 A1 * | 1/2018 | Anderson | A01G 33/00 | |
| 2018/0058027 A1 * | 3/2018 | Wilkinson | E02B 3/127 | |
| 2018/0238006 A1 * | 8/2018 | Wilkinson | E02B 3/125 | |
| 2019/0112770 A1 * | 4/2019 | Lee | E02B 3/14 | |
| 2019/0153687 A1 * | 5/2019 | Cooley | E02B 3/04 | |
| 2019/0234042 A1 * | 8/2019 | Burkett | E02B 3/124 | |
| 2019/0376248 A1 * | 12/2019 | Wilkinson | E02D 17/20 | |
| 2021/0395968 A1 * | 12/2021 | Zhu | E02B 3/04 | |
| 2022/0349139 A1 * | 11/2022 | Wilkinson | E02D 5/80 | |
| 2023/0002989 A1 * | 1/2023 | Wilkinson | E02D 17/202 | |
| 2023/0183933 A1 * | 6/2023 | Evans | E02D 17/202 | 405/16 |

OTHER PUBLICATIONS

South Carolina Department of Health and Environmental Control; "South Carolina Coastal Management Program Section 309 Assessment and Strategy 2016-2020"; URL: https://coast.noaa.gov/data/czm/enhancement/media/sc309-2016.pdf (Year: 2015).*

Seabreeze Erosion Solutions; "Crushed shell and littorals as a shoreline erosion control method- Seabreeze Erosion"; URL: https://www.youtube.com/watch?v=OygS5BIEaRE (Year: 2020).*

Karen Walzer, Group Using Oysters to Stop Erosion at Mordecai Island, Aug. 7, 2017, https://www.barnegatbaypartnership.org/group-using-oysters-stop-erosion-mordecai-island/.

Hannah Laclaire, Brunswick is using oyster shells to combat coastal erosion, Feb. 3, 2020, https://www.pressherald.com/2020/02/03/brunswick-is-using-oyster-shells-to-combat-coastal-erosion/.

Jeremy Sutton-Hibbert, sea wall made of clam shells, to halt erosion of land by waves, on Han Island, Carteret Atoll, Papua New Guinea, Dec. 9, 2006, https://www.alamy.com/stock-photo-sea-wall-made-of-clam-shells-to-halt-erosion-of-land-by-waves-on-han-27528683.html.

* cited by examiner

SHORELINE STABILIZATION AND EROSION CONTROL

BACKGROUND OF THE INVENTION

1. Field of the Invention

The present invention pertains to systems and methods used to stabilize shorelines and control the erosion of a waterbody, such as a pond or lake.

2. Background of the Invention

Shorelines of many waterbodies are impacted by erosion, such as, terrestrial forces, aquatic forces and human activities.

Typical terrestrial forces impacting shoreline erosion are groundwater exerting pressure on soil particles, downhill movement of soil or loose rock on a slope, frost action in poorly drained soils, and/or wind erosion due to soils that are dry or fine. Typical aquatic forces impacting shoreline erosion are direct contact from a water source such as rain, sheet erosion due to the laminar or turbulent flow of a water source across the surface area of the shoreline, rilling/gullying due to rainfall removing channels of shoreline, wave action from the waterbody, longshore drift, and/or ice push. Typical human activities impacting shoreline erosion are the use of level control structures, e.g., dam, the removal of natural vegetation, or storm water runoff that is directed to a waterbody.

Erosion may lead to drop-offs and steep banks which are not safe for people or pets and may be against local/state codes.

In many areas, systems for stabilizing and controlling erosion involve the use of bulkheads, geotubes, riprap revetments or other hardened shoreline structures within individual lakes and may require special approvals and permits.

In one system, there is provided a living shoreline to prevent the erosion of an island. *Barnegat Bay Partnership* (https://www.barnegatbaypartnership.org/group-using-oysters-stop-erosion-mordecai-island/). The system involves growing oyster larvae on recycled clam shells and then transplanting the oysters to a bay parallel to the shoreline of the island.

In another system, oyster shells are placed in customized coconut-fiber bags and synthetic baskets that are then placed in the water below the highest annual tide. *The Times Record* (https://www.pressherald.com/2020/02/03/brunswick-is-using-oyster-shells-to-combat-coastal-erosion/). The system may also use tree trunks placed perpendicular to the shoreline to provide a 'ramp' for any ice to ride up and over the bags/baskets.

In another system, clam shells are placed on directly on a shoreline. *Alamy* (https://www.alamy.com/stock-photo-seawall-made-of-clam-shells-to-halt-erosion-of-land-by-waves-on-han-27528683.html).

What is needed in the art is a system that effectively reduces or eliminates shoreline erosion.

SUMMARY OF THE INVENTION

In one exemplary embodiment formed in accordance with the present disclosure, there is provided a shoreline stabilization and erosion control system. The system includes a riparian area with a waterbody adjacent to the riparian area. The waterbody may include a waterbody bed and an emergent area forming an area between the waterbody bed and the riparian area. The system may use a top layer in connection with and covering a portion of the emergent area with a plurality of littoral pockets being formed in at least one of the emergent area and the top layer. The system may also use a plurality of littoral plants planted into plurality of littoral pockets.

In another exemplary embodiment of formed in accordance with the present disclosure, there is provided a method for stabilizing and controlling erosion of a shoreline. The method may include steps for grading, reclaiming, distributing, covering, placing, and planting.

Grading typically occurs in an area from a waterbody bed to a proximal region of an adjacent riparian area. Reclaiming may include removal of eroded material from a waterbody body bed. Distributing may include dispersing the subgrade material onto the graded area or another material. Covering the subgrade material with a top layer may include covering the entire layer with a constant thickness or with a varying thickness across the entire area being covered by the subgrade material. Placing a plurality of littoral pockets may include placing the littoral pockets into the subgrade material, into the top layer, or at some point between. Planting a plurality of littoral plants into the plurality of littoral pockets with a growing grade material may be accomplished through use of one type of littoral plant or with multiple types of littoral plants.

An advantage of the present invention is the use of naturally occurring materials.

Another advantage of the present invention is it allows various configurations for multiple types of waterbodies.

Another advantage of the present invention is it solves the problem of land-loss.

Another advantage of the present invention is it solves the problem of communities being out of compliance with local codes.

Another advantage of the present invention is it solves the problem of a dangerous lake shoreline in which children, pets, or the elderly could potentially fall and break a leg or other injury.

Another advantage of the present invention is it solves the problem of lawn care companies running riding mowers and getting too close to the lake bank and falling into a body of water.

Another advantage of the present invention is it solves the problem of communities' lakes not being in compliance with original development orders that require a certain number of littoral plants to be living on the lake's banks.

Another advantage of the present invention is it solves the problem of irrigation pipes, electrical lines, and storm water management devices failing from erosion.

Another advantage of the present invention utilizing shell is that it allows vegetative reproduction—from underground rhizomes—of native littoral plants while protecting the soil that they grow in while they are colonizing and establishing, unlike other solutions which inhibit vegetative reproduction. The littoral plants may then colonize to create natural wetland. This natural wetland area helps filter and clean the water, provides habitat for fish and wildlife, adds to the aesthetics of a body of water, and stabilizes the shoreline to help prevent erosion.

Another advantage of the present invention utilizing shell is that it is a natural pre-emergent, e.g., weed control, which prevents germinated weed seedlings from becoming established. In turn, this may prevent unwanted exotic weeds from rooting and establishing on the shoreline thus saving thousands of dollars a year to spray exotic weeds and kill them with cancer causing herbicides.

Another advantage of the present invention utilizing shell is the reduction and/or elimination of using herbicides to kill exotic weeds along a shoreline.

Another advantage of the present invention utilizing shell is that it gradually compacts over time and becomes integrated into the native soil underneath it. This means, like a fine wine or cheese, it gets better with age. Eventually, the shoreline may become comprised of a compacted 50/50 shell/dirt mixture with similar properties to concrete, all while being "hidden" by the colonies of native littoral plants growing on it.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
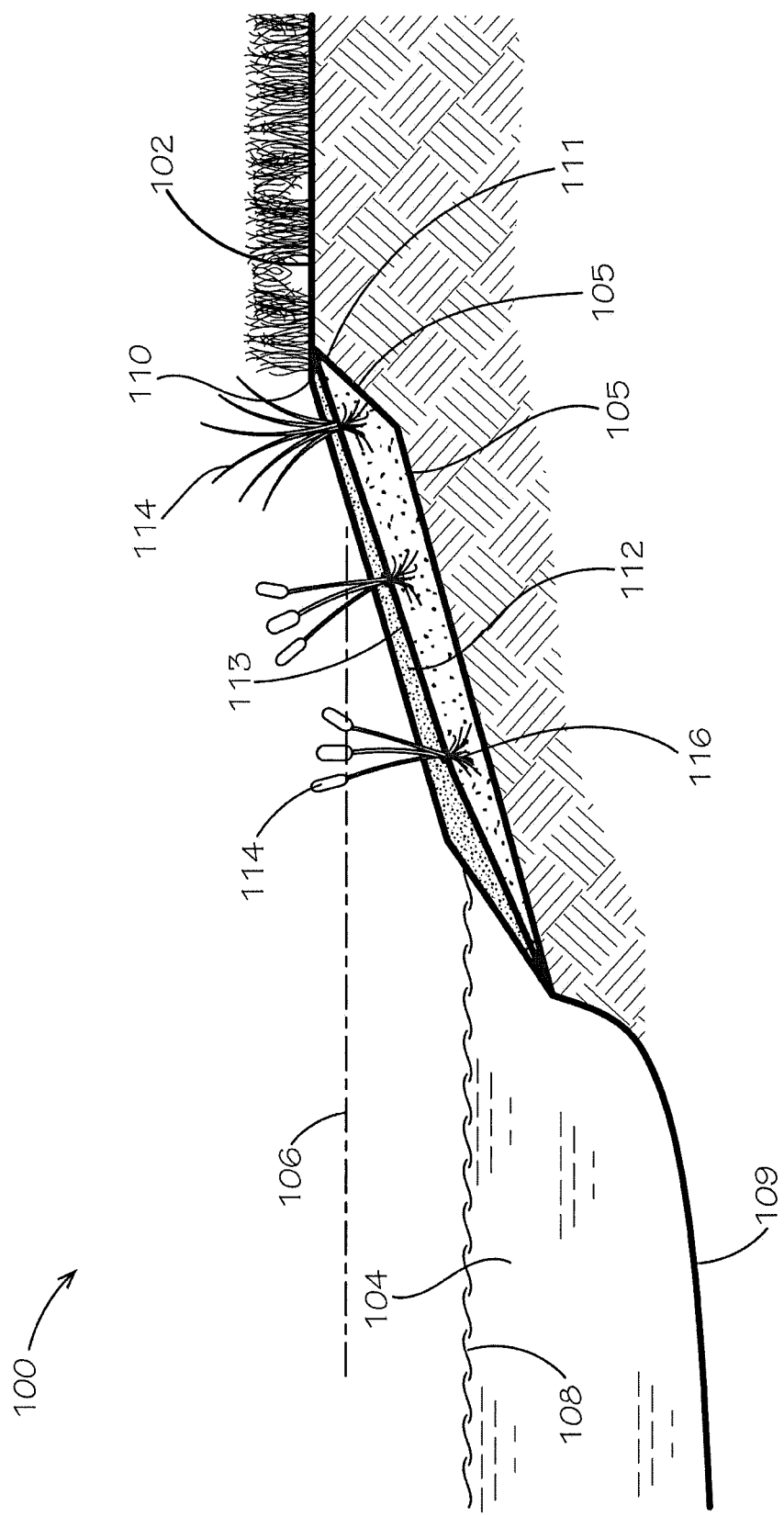
FIG. 1 illustrates an embodiment of a system for shoreline stabilization and erosion control according to the invention.

Referring now to the drawings, are more particularly to FIG. 1 there is shown an exemplary embodiment of a shoreline stabilization and erosion control system 100. The system 100 may include a riparian area 102 adjacent to a waterbody 104. The waterbody 104 may be fresh, salt or brackish. The waterbody 104 may have a height, relative to the riparian area 102 that covers an emergent area 105 when the waterbody 104 is at a control level 106. The control level 106 may be man-made such as with an outfall control structure, e.g., dam. The control level 106 may also occur naturally, such as through a stream or ditch allowing water to flow away from the waterbody 106.

The emergent area 105, may have a pre-existing or modified grade, and may be exposed when the height of the waterbody 104 is at a dry season level 108. The dry season level 108 may be impacted by many variables, such as precipitation, snowmelt/rain runoff, drought, evaporation rates, and people withdrawing water for multiple uses. The emergent area 105 may have a constant slope from a waterbody bed 109 to the riparian area 102.

The area between the riparian area 102 and the emergent area 105 may also include a transition zone 110, e.g., an area that may be higher or lower than the riparian area 102 and the emergent zone 105. The transition zone 110 may occur naturally due to erosion or movement of material. The transition zone 110 may also occur due to man-made forces such as the piling of material or the digging of a trench. The transition zone 110 may also include gravel or rock.

The emergent zone 105 may have an emergent zone slope change 111 that is greater or less than the slope of the emergent zone 105, for instance, an ecsarpment, being in contact with the waterbody bed 109. The emergent zone slope change 111 may be affected by many variables, such as, changes in the height of the waterbody 104, i.e., flooding or severe drought, or due to shoreline erosion mechanisms, including but not limited to, terrestrial forces, aquatic forces and human activities that effects only a portion of the emergent area 105. The emergent zone slope change 111 may be steep, e.g., 2:1 or 50%, to shallow, e.g. 4:1 or 25%, and may be modified to meet requirements of local ordinances or to prevent any material added above the emergent zone 105 from cascading down from the transition area 110 to the waterbody 109. It should be understood that the emergent zone slope change 111 is not required to fall within the above referenced range and may be modified or left alone as needed.

The system 100 may further include a top layer 112 being arranged above the emergent area 105 and at a height equal to or less than the height of the transition zone 110. This configuration advantageously provides a sloped surface 113 from the riparian area 102 to the emergent zone 105.

The thickness of the top layer 112 may be of any thickness suitable for a particular application but will generally have a thickness from 1" to 24". The thickness of the top layer 112 may be uniform from the transition area 110 to the waterbody 109 or it may vary to create a sloped surface 113 that is greater or less than the emergent zone slope change 111. The thickness of the top layer 112 may also fluctuate along the emergent zone 105, for instance, when trenches, holes, or other surface features in the emergent zone 105 occur.

Additionally, a plurality of littoral plants 114 may be arranged such that the root ball of any single littoral plant 114 is placed fully in the emergent area 105, fully in the top layer 112, or partially in the emergent area 105 and the top layer 112. The top layer 112 and/or the emergent area 105 may also include a littoral pocket 116 in which a root ball of any single littoral plant 114 may be placed fully or partially within.

The thickness of the top layer 112 may also be adjusted to conform to specific growing conditions for some types of littoral plants. For instance, in a top layer 112 being composed fully or primarily of seashells, the top layer 112 may be thinner for any single littoral plant 114 that does not root well in a high alkaline environment such that the root ball of the single littoral plant 114 is placed fully in the emergent area 105 and may be thicker or any single littoral plant 114 that does root well in a high alkaline environment such that the root ball of the single littoral plant 114 is placed fully in the top layer 112 or partially in the emergent area 105 and the top layer 112.

Figure 2:
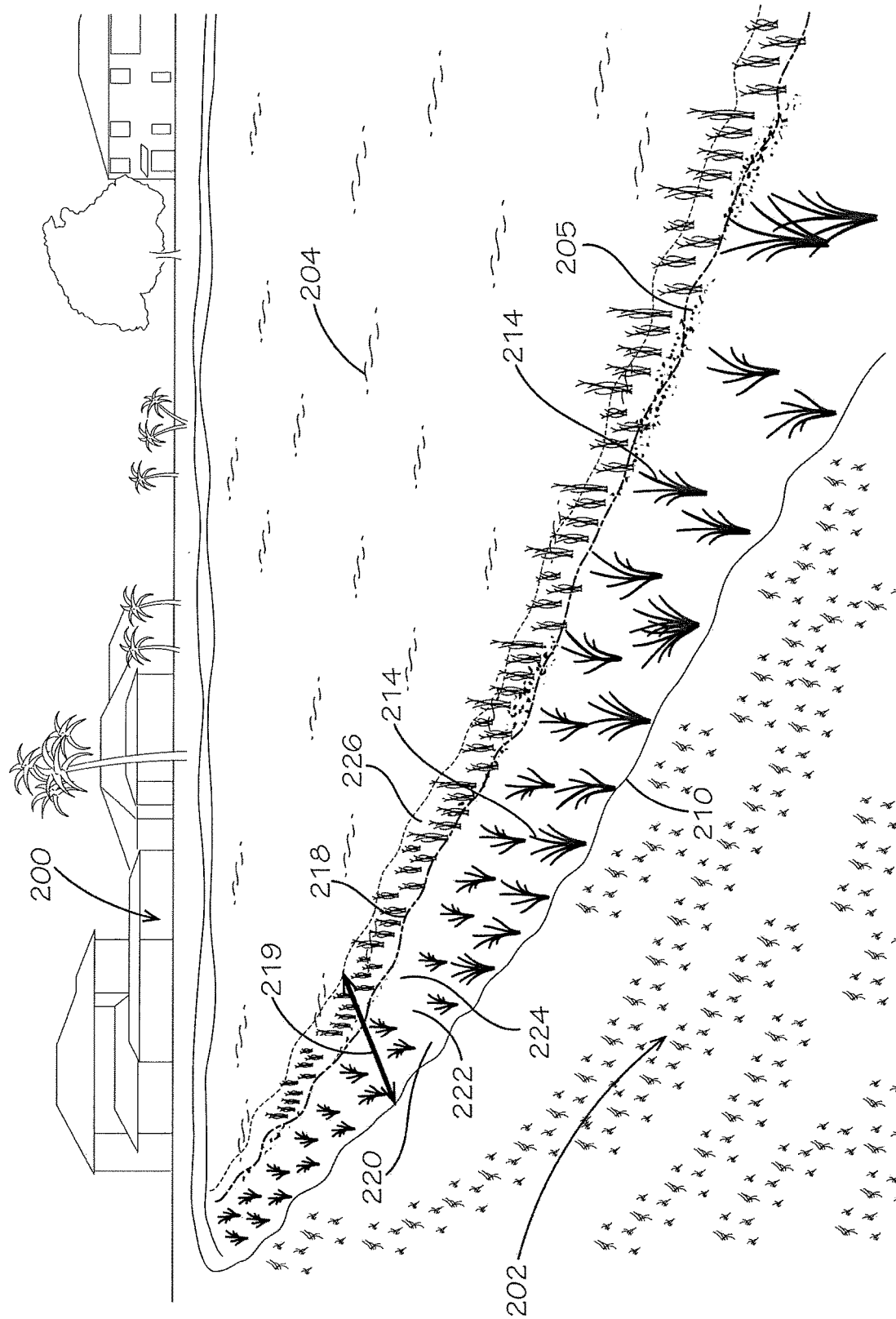
FIG. 2 illustrates another embodiment of a system for shoreline stabilization and erosion control according to the invention.

Now referring to FIG. 2, there is shown an embodiment of a system 200 having an arrangement of littoral plants 214 such that the rows are created along the riparian area 202. While this arrangement shows the littoral plants 214 in rows substantially equidistant from a transition zone 210 and other rows of the system 200, it should be understood that the rows of littoral plants 214 may be substantially equidistant to a waterline 218 being created where an edge of the a waterbody 204 contacts the emergent area 205 and/or randomly placed such that the littoral plants 214 are no longer in rows. The waterline 218 may also include gravel or rock or native soil or reclaimed eroded soil or imported fill dirt.

Also being shown in FIG. 2, is a littoral zone 219 being created by the planting of the littoral plants 214. The littoral zone 219 may include an upper littoral zone 220, a mid-littoral zone 222, a lower littoral zone 224, and/or a submerged littoral zone 226. The littoral plants 214 in the littoral zone 218 may be homogenous or heterogeneous.

Typically, the upper littoral zone 220 may include plants such as Sand Cordgrass, Muhly Grass, Saltmarsh Cordgrass; the mid-littoral zone 222 may include plants such as Swamp Lily, Golden Cana, Blueflag Iris, Spider Lily; the lower littoral zone 224 may include plants such as the Pickerelweed, Bulltongue Arrowhead, Spikerush, Arrowhead; and the submerged littoral zone 226 may include plants such as the Spadderdock, Fireflag. While the aforementioned littoral plants 214 have been described as being in a certain portion of the littoral zone 218, it should be understood that any littoral plant 214 may be planted in any zone that allows for its growing.

Figure 3:
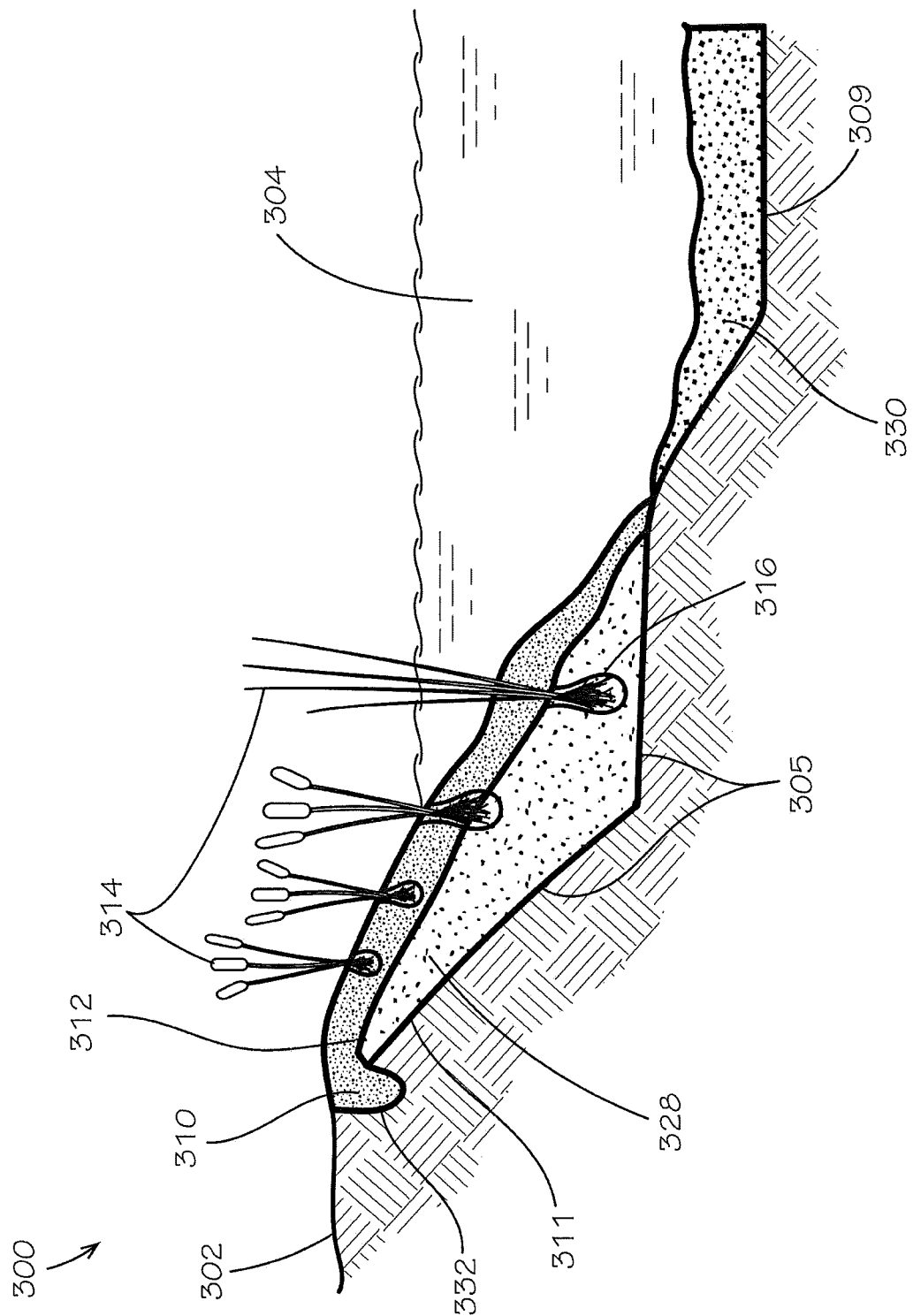
FIG. 3 illustrates yet another embodiment of a system for shoreline stabilization and erosion control according to the invention.

Now referring to FIG. 3, there is shown a cross sectional view of an exemplary embodiment of a shoreline stabilization and erosion control system 300. The system 300 may include a riparian area 302, a waterbody 304, an emergent area 305, a top layer 312, at least one littoral plant 314, at least one littoral pocket 316, and at least one mid layer 328, where the at least one mid layer is placed between the top layer 312 and the emergent area 305, and in connection with an emergent zone slope change 311.

The at least one mid layer 328 may be composed entirely of a reclaimed subgrade 330 found on a waterbody bed 309, or another type of subgrade material being used alone or being mixed with the reclaimed subgrade 330. A transition zone 310 may include an area that is lower than the adjacent riparian area 302, such as a trench 332 or other similar formation that allows for the top layer 312 or the at least one mid layer 328 to fill the transition zone 310.

Figure 4:
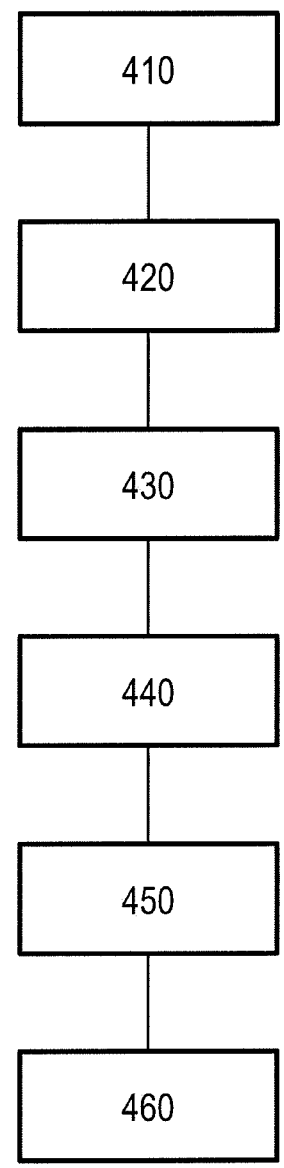
FIG. 4 illustrates a method for stabilizing and controlling erosion of a shoreline according to the invention.

Referring now to FIG. 4, there is shown a method 400 for stabilizing and controlling erosion of a shoreline. The method 400 includes grading 410 an area from a waterbody emergent area to a proximal region of an adjacent riparian area; reclaiming 420 a subgrade material from a waterbody body bed; distributing 430 the subgrade material onto the graded area; grading, compacting, and/or leveling the subgrade material in order to create a uniform subgrade, covering 440 the subgrade material with a top layer; placing 450 littoral pockets into the subgrade material; and planting 460 littoral plants into the littoral pockets with a growing grade material.

Grading 410 may include the piling of material or digging of a trench at a transition areas between the riparian area and emergent zone. Grading 410 may affect the slope of an emergent zone, the slope of an emergent zone slop change, the slope of a riparian area, and/or the slope of a waterbody bed.

Reclaiming 420 may include obtaining material from the waterbody that the method is being applied to, from another waterbody, or from another area having material suitable for use as subgrade material, for instance, utilizing an imported blend of material comprised of a combination of silt, sand, organic matter, and clay in various percentages. The reclaiming 420 may also include combining of the aforementioned materials in various percentages of composition.

Distributing 430 may be accomplished as a uniform layer of subgrade material across a graded area or may be altered such that the thickness of any one layer is altered to create a uniform slope from a riparian area to a waterbody bed or emergent zone. The top layer in covering 440 may have a composition of crushed fresh and/or saltwater shells. The placing 450 littoral pockets into the subgrade material may alternatively occur in the top layer or within the subgrade material and the top layer.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A shoreline stabilization and erosion control system for use on a riparian area wherein the riparian area is adjacent to a waterbody, said system comprising:
    the waterbody having a waterbody bed and an emergent area forming an area between the waterbody bed and the riparian area;
    a graded area formed from the emergent area to a proximal region of the riparian area;
    a subgrade material distributed onto the graded area between the waterbody emergent area to the proximal region of an adjacent riparian area;
    covering the subgrade material with a top layer comprised solely of crushed seashells;
    a plurality of littoral pockets being formed in the emergent area and the top layer; and
    holes being formed in the top layer of crushed seashells;
    the littoral pockets being placed into the subgrade material below said holes; and
    littoral plants being placed though said holes in said top layer and planted in said littoral pockets.

2. The shoreline stabilization and erosion control system of claim 1, wherein the top layer and subgrade combined is 1" to 24" thick.

3. The shoreline stabilization and erosion control system of claim 1, wherein the top layer is 3" to 8" thick.

4. The shoreline stabilization and erosion control system of claim 1, wherein the top layer covers the entire emergent area.

5. A method for stabilizing and controlling erosion of a shoreline, the method comprising:
    grading an area from a waterbody emergent area to a proximal region of an adjacent riparian area;
    distributing a subgrade material onto the graded area between the waterbody emergent area to the proximal region of an adjacent riparian area;
    covering the subgrade material with a top layer comprised solely of crushed seashells;
    creating holes in the top layer of crushed seashells in order to place a plurality of littoral pockets into the subgrade material;
    placing a plurality of littoral pockets into the subgrade material, the littoral pockets being placed into the subgrade material below said holes; and
    planting a plurality of littoral plants into the plurality of littoral pockets so each plant extends through the respective hole in the top layer of crushed seashells.

6. The method of claim 5, wherein grading of the area from the waterbody bed to the proximal region of an adjacent riparian area creates a constant slope.

7. The method of claim 5, wherein grading of the area from the waterbody bed to the proximal region of the adjacent riparian area creates a constant slope of 3:1 to 6:1.

* * * * *